United States Patent [19]
Blair

[11] 3,823,300
[45] July 9, 1974

[54] SEAM WELDING METHOD
[75] Inventor: Robert H. Blair, Bay City, Mich.
[73] Assignee: Resistance Welder Corporation, Bay City, Mich.
[22] Filed: Dec. 11, 1972
[21] Appl. No.: 313,773

[52] U.S. Cl............... 219/83, 219/81, 219/67
[51] Int. Cl............................. B23k 11/06
[58] Field of Search......... 219/82, 83, 91, 110, 111, 219/112, 59, 67, 78, 80, 81, 108, 109, 113, 114

[56] References Cited
UNITED STATES PATENTS

| | | | |
|---|---|---|---|
| 2,092,093 | 9/1932 | Silverman | 219/83 |
| 2,175,920 | 10/1939 | Schnarz | 219/83 X |
| 2,301,424 | 11/1942 | List et al. | 219/91 X |
| 2,415,708 | 2/1947 | Seiaky | 219/112 |
| 2,826,674 | 3/1958 | Peras | 219/91 |
| 2,882,384 | 4/1959 | Foster | 219/104 X |
| 3,588,435 | 6/1971 | Ecki et al. | 219/108 |
| 3,654,424 | 4/1972 | Vanderhelst | 219/110 |

Primary Examiner—E. A. Goldberg
Assistant Examiner—G. R. Peterson
Attorney, Agent, or Firm—Learman & McCulloch

[57] ABSTRACT

A high speed seam welding method wherein single phase alternating current welding pulses, of sufficient amperage to produce the energy to weld the material when transmitted during only a fractional portion of each current half cycle, are applied to electrode mechanism during only a less than maximum amplitude fractional portion of the wave form representing each successive current half cycle, and the current is substantially cut off between current applications to permit cooling. The relative seam welding movement of the electrode mechanism and the material to be seam welded is coordinated with the duration of the welding and cooling periods to more rapidly form a line of uniform weld nuggets.

7 Claims, 3 Drawing Figures

PATENTED JUL 9 1974

3,823,300

SEAM WELDING METHOD

BACKGROUND OF THE INVENTION

This invention relates generally to the art of resistance seam welding by the application of single phase, alternating current to welding electrodes in a manner to provide a succession of alternate welding and cooling stages synchronized with the frequency of the alternating current. Present commercial seam welding systems of the character mentioned have generally been of the type wherein the heat time or weld pulses have consisted of one or more full cycles of commercial frequency, alternating current, followed by a cool time or inter-pulse time which also was of a duration consisting of one or more full cycles of current. In such systems, the current employed must have a certain minimum requirement in terms of instantaneous value since below a certain value no weld will occur for sheet stock of given thickness. A second requirement in present-day systems is that the ratio of peak current to average current be considerably greater than one, and a third requirement is that peak values of current shall be of a suitable frequency to meet the required number of welds per inch of stock travel.

The use of heat time and cool time cycles consisting of one or more complete cycles of current, of course, raises the ratio of peak current to average current. The weld speed is, further, necessarily controlled by the frequency of weld pulses required to produce the required number of welds per inch and, in such systems, speeds cannot exceed what have come to be accepted in the trade as normal or regular speeds for various material thicknesses. In high production assembly lines, such as employed for instance in the manufacture of vehicle bodies, appliance cabinetry, and heat exchanger components, it is important for the seam welding equipment to accomplish its function as rapidly as possible so that production rates may be as fast as possible.

Some system variations have been proposed, such as that illustrated in Silverman U.S. Pat. No. 2,092,093 wherein welding current is symmetrically applied at the midpoint of the half cycle to weld thin parts such as ordinary tin cans. Such systems do not, of course, teach what I have conceived nor do I believe that they have found any wide commercial use, and particularly any use with heavier gauge metals. Other systems of which I am aware are disclosed in U.S. Pat. Nos. 2,175,920; 2,243,832; 2,429,186; 2,394,004; 3,569,659; 2,415,708; and 2,413,083.

OBJECTS OF THE INVENTION

One of the prime objects of the present invention is to provide a method of the character described which may weld, for example, as much as 400 percent faster than previous systems.

Another object of the invention is to provide a method which is accordingly capable of effecting huge economies in the seam welding of stock of various thicknesses, and as a result permits the much more economic manufacture of structures and units of all types.

A further object of the invention is to provide a synchronized seam welding method which not only is more rapid, but also achieves improved weld quality due to the low total heat in the weld.

Another object of the invention is to provide a method which employs a lower total RMS weld current and thus obtains longer electrode life.

Still another object of the invention is to provide a method of welding, as described, for a system which can be selectively operated at high speed or at conventional speed as desired.

A further object of the invention is to provide a method of the type described wherein a welding transformer which is designed for saturation when the circuit is conditioned for high-speed operation is utilized, thus providing over-current protection when used in conjunction with conventional circuit protection devices.

A still further object of the invention is to provide a seam welding method of the character described which produces consistently high quality welds wherein the weld nuggets are uniformly of optimum size, and splashed and low strength welds due to excessive heat input are avoided.

Other objects and advantages of the present invention will become apparent to those of ordinary skill in the art as the following description thereof proceeds.

SUMMARY OF THE INVENTION

A method of welding wherein frequency synchronized, high speed resistance seam welding is accomplished by continuously relatively moving an electrode mechanism and the material to be seam welded at a predetermined speed in terms of distance while maintaining them in a state of pressurized welding engagement, and which passes impulses of alternating current to the electrode mechanism during only a less than maximum amplitude fractional portion of the wave form representing each successive current half cycle.

IN THE DRAWINGS

Figure 1:
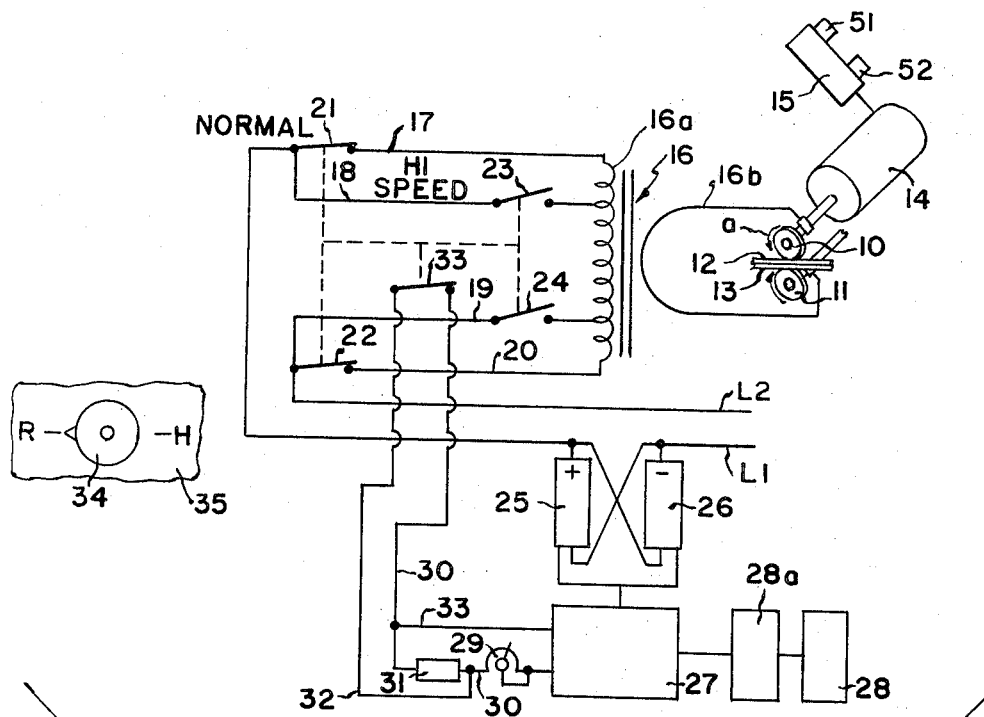
FIG. 1 is a typical circuit diagram illustrating a system which can be utilized to weld at normal, as well as high, speeds.

Referring now more particularly to the accompanying drawings wherein I have illustrated a preferred form of the invention, I have shown a pair of conventional disc welding electrodes 10 and 11 in FIG. 1 for, typically, welding a pair of lapped metal sheets 12 and 13. The electrodes 10 and 11 are of conventional construction and operate in the usual manner, the electrode 10 being driven, for instance, in the direction of rotation *a* by a suitable rotary hydraulic or other adjustable speed motor 14 and the electrode 11 being driven at the same speed by a gear (not shown) also driven by the motor 14.

The speed of motor 14, which may be an electric motor Model ACM9033 manufactured by Eaton Manufacturing Co. of Cleveland, Ohio may be adjusted by virtue of a control 15, which in the usual manner controls a valve in the hydraulic system for supplying oil to motor 14. Both the electrode 10 and motor 14 are in the conventional manner mounted on a vertical slide provided on the frame of the machine as in the aforementioned U.S. Pat. No. 3,569,659 and, in the conventional manner, the system employs a fluid pressure operated cylinder for forcing the electrode 10 vertically toward the electrode 11 to squeeze the workpieces 12 and 13 between them and apply the welding pressure. Such a system, of course, permits the miniscule vertical movement of the electrode 10 occasioned by expansion of the workpiece leading to a movement of separation of the electrodes and, toward the end of the weld, sinking of the electrodes into the softened workpiece and then cooling of the workpieces which causes contraction.

In the circuit shown in FIG. 1, the electrodes 10 and 11 are each connected to the secondary terminals of a step up welding transformer 16 and single phase, 60 cycle, alternating current is supplied via power lines L1 and L2. The line L1 is connected to the primary of the transformer 16 via a pair of parallel lines 17 and 18 and the line L2 is connected to the primary 16a of transformer 16 via a pair of parallel lines 19 and 20. What may be termed "normal" or "regular" speed switches 21 and 22 are provided in the lines 17 and 20 respectively, and "high" speed switches 23 and 24 are provided in the parallel lines 18 and 19.

Also connected in line L1 are the pair of ignitron tubes 25 and 26 which are incorporated in the phase shift heat control 27. The conventional ignitron tube 25 fires only when current is flowing in the positive direction as represented by the half cycle b in FIG. 2, and the ignitron tube 26 can be fired only when the current is flowing in the negative direction, as indicated by the half cycles of current flow identified by the letter c in FIG. 2. The firing of tubes 25 and 26 is controlled by a conventional phase shift heat control 27 of, for example, the model 804-8027 S5H solid state seam welder control with D size ignitron tubes manufactured by Weltronic Co. of Southfield, Michigan, which typically also includes resetting timers 28 and 28a, and a potentiometer 29. Such controls are described in some of the aforesaid patents and are available in the marketplace from a number of manufacturers. The potentiometer 29 is provided in a circuit line 30 in series with a resistor 31 which functions to delay the firing time or time of current application when it is a part of the operating circuit. A line 32 is provided in parallel with line 30 and a switch 33 is provided to close or open the terminals which connect the lines 30 and 32 dependent upon whether the seam welding is to proceed at "high" or "normal" speed. A circuit line 33 bypasses line 30.

A revolvable control knob 34 is mounted on a control panel 35 and is movable between the H and R positions to condition the circuit for operation either at "high" or "regular" speeds. The knob 34 is connected, as the broken lines in FIG. 1 indicate, to simultaneously control switches 21, 22, 23, 24 and 33. Where the motor 14 is to be operated at, for example, only 2 speeds, the knob 34 could also operate to make a switch S1 which would cause motor 14 to be driven at a regular speed, as when knob 34 is turned to align with the R symbol, or a switch S2 when the knob 34 is turned to align with the H symbol. It should be understood, however, that more normally it will be necessary that the motor 14 operate at a wide range of speeds to weld a widely varying range of material thicknesses.

THE OPERATION

In FIG. 1, the circuit is shown as conditioned to weld at what might be termed a "regular" welding speed which typically may be 30 welds per second. Materials of 0.050 to 3/16 of an inch range in thickness may typically be welded at such a speed, for instance 16-gauge 10—10 uncoated steel. When the circuit is set up for "normal" speed operation, the knob 34 is turned to the R position and switches 21, 22 and 33 are closed, switches 23 and 24 are opened, and accordingly the resistor 31 is cut out of the circuit. The motor control 15 will be set to operate motor 14 at the so-called "normal" speed, and phase shift heat control 27 will sense the zero current points identified by the letter d and alternately fire the ignitron tubes 25 and 26 to provide pulses of welding current identified by the darkened portions e of the welding transformer secondary current wave form illustrated in FIG. 3.

Figure 3:
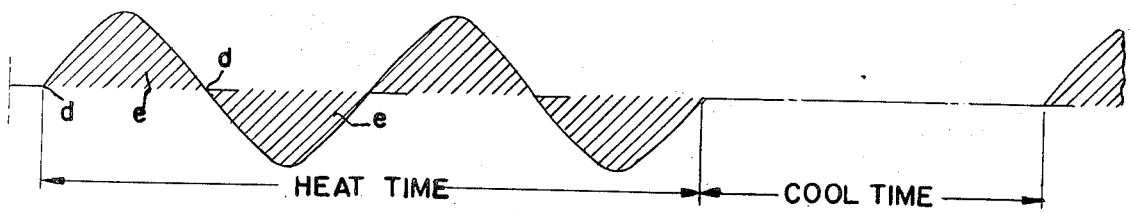
FIG. 3 is a similar diagram or graph illustrating the timing of the current applications when the system is operated at a conventional welding speed.

In FIG. 3, current is applied to the primary 16a of transformer 16, via lines L1 - L17 and L2 - L20, during a heat time which extends for essentially two full cycles. The automatically resetting timer 28, which makes the circuit via tubes 25 and 26, is energized at the time of initial application of current, when phase shift control 27 senses the beginning of a cycle and times out after two complete cycles. Thereafter, automatically resetting timer 28a is immediately energized and breaks the circuit to prevent firing of tubes 25 and 26 during a cool time of one full cycle's duration, after which timer 28 is then reenergized to time the next heat or weld period.

Figure 2:
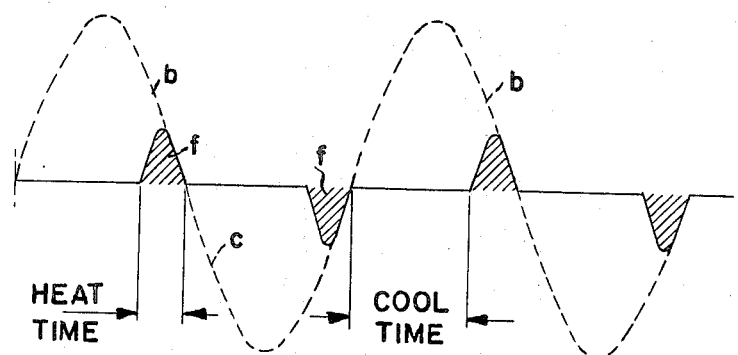
FIG. 2 is a wave form diagram illustrating the high speed welding method and timing of the current applications when the system is welding at high speeds.

In FIG. 2 the similar wave form diagram illustrates the time of current application when timers 28 and 28a are not used and the system is conditioned for "high" speed operation, for example, 120 welds per second at a time when two sheets of 18-gauge, 10—10 uncoated steel are to be lap seam welded at approximately 500 inches per minute. To condition the circuit illustrated in FIG. 1, it is merely necessary to turn the control knob 34 to the H position which opens switches 21, 22, and 33 and closes switches 23 and 24. This places the resistor 31 in the circuit and the resistor 31 delays the firing until the terminal portion f of each half cycle. As in the case of "normal" speed welding, the potentiometer 30 permits some tuning of the heat energy applied to suit various thicknesses of material.

The concept involved in high speed operation is to apply current only during a fractional portion of each half cycle as indicated by the darkened portions f in FIG. 2. Weld speeds of 400 to 700 inches per minute with carbon steels and stainless steels are possible with the circuit conditioned for high-speed operation with sheet in a range of approximately 0.050 inches in thickness down to gauges as thin as 0.010 inches in thickness. During high-speed operations sufficient welding current to effect a weld at the amplitude indicated by areas f is transmitted to the primary 16a of transformer 16 via lines L1 - L18 and L2 - L19. The control 27 alternately fires ignitrons 25 and 26, but because of the resistor 31, current application does not occur until, ideally, the last 60° of the current half cycle. More generally, it may be said that current is being applied during approximately the last third of each half cycle during the last 75° - 40° thereof. As FIG. 2 well demonstrates, the heat time or weld time is reduced considerably compared to FIG. 3, and so is the cool time. This then results in more uniform and consistant welds which may, for instance, be made up of connected, or spaced apart weld nuggets as desired, dependent upon the speed of motor 14. The lines 18 and 19 connect to the primary 16a of transformer 16 at points intermediate the ends thereof so that the transformer transmits current to the single coil secondary 16b which will weld even at the reduced amplitude of areas f. The maximum amplitude of the wave form shown in FIG. 2 is accordingly greater than the maximum amplitude of the wave form illustrated in FIG. 3. The maximum amplitude of the FIG. 3 wave form is about 0.6 of the maximum amplitude of the FIG. 2 wave form.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a seam welding method wherein the welding periods are synchronized with the frequency of the alternating current used to weld: the steps of continuously relatively moving an electrode mechanism and metallic material to be seam welded at a predetermined speed in terms of distance traveled per time interval while maintaining them in a state of welding engagement; applying single phase AC current, of sufficient amperage to produce the energy to weld the material when transmitted during only a fractional portion of each successive current half cycle, to the electrode mechanism; and timing the said current transmission such that it occurs in a portion of each successive half cycle which is at less than the maximum amplitude of the current wave form, while substantially cutting off the current between current applications to permit cooling; and coordinating the said relative movement to current application such that a line of uniform weld nuggets is obtained.

2. The combination defined in claim 1 in which said time of current application is about one third of the duration of the half cycle.

3. The combination defined in claim 1 in which said current application commences in the range of 75° - 45° from the end of each half cycle and terminates at the end of each half cycle with the change in polarity.

4. The combination defined in claim 3 in which the material being welded is on the order of 0.010 - 0.050 inches in thickness.

5. In a seam welding method wherein the welding periods are synchronized with the frequency of the alternating current used to weld: the steps of continuously relatively moving an electrode mechanism and metallic material to be seam welded at a predetermined speed in terms of distance traveled per time interval while maintaining them in a state of pressurized welding engagement; applying single phase AC current, of sufficient amperage to produce the energy to weld the material when transmitted during only the terminal portion of each successive current half cycle, to the electrode mechanism; and timing the said current transmission such that it occurs in each successive half cycle only after the maximum amplitude of the said current wave form would be reached were transmission occurring during the entire half cycle, while cutting off the current between current applications to permit cooling; and coordinating the said relative movement to current application such that a line of uniform weld nuggets is obtained.

6. The method of claim 5 wherein said current is applied at a welding value during only approximately the last 75° - 40° of each half cycle.

7. The method of claim 5 wherein the current is transmitted via a power step up element connected in circuit with a power source of commercial frequency which is positively cut off from the element between half cycles.

* * * * *